US011307377B2

United States Patent
Arai et al.

(10) Patent No.: US 11,307,377 B2
(45) Date of Patent: Apr. 19, 2022

(54) LIGHT SOURCE DEVICE, PROJECTOR AND LIGHTING DEVICE

(71) Applicant: MAXELL, LTD., Kyoto (JP)

(72) Inventors: Masatoshi Arai, Kyoto (JP); Kazuo Shikita, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/269,765

(22) PCT Filed: Jul. 10, 2019

(86) PCT No.: PCT/JP2019/027398
§ 371 (c)(1),
(2) Date: Feb. 19, 2021

(87) PCT Pub. No.: WO2020/039783
PCT Pub. Date: Feb. 27, 2020

(65) Prior Publication Data
US 2021/0302688 A1    Sep. 30, 2021

(30) Foreign Application Priority Data
Aug. 22, 2018  (JP) .............................. JP2018-155675

(51) Int. Cl.
G02B 7/04 (2021.01)
F21V 9/32 (2018.01)
F21V 14/06 (2006.01)
G03B 21/20 (2006.01)

(52) U.S. Cl.
CPC .................. *G02B 7/04* (2013.01); *F21V 9/32* (2018.02); *F21V 14/06* (2013.01); *G03B 21/204* (2013.01); *G03B 21/208* (2013.01); *G03B 21/2066* (2013.01)

(58) Field of Classification Search
None
See application file for complete search history.

(56) References Cited

U.S. PATENT DOCUMENTS

2020/0225564 A1    7/2020  Sato

FOREIGN PATENT DOCUMENTS

| JP | 08-76005 A | 3/1996 |
|---|---|---|
| JP | 2012-018762 A | 1/2012 |
| JP | 2016-024975 A | 2/2016 |

(Continued)

OTHER PUBLICATIONS

International Search Report of PCT/JP2019/027398 dated Aug. 13, 2019.

*Primary Examiner* — Vip Patel
(74) *Attorney, Agent, or Firm* — Mattingly & Malur, PC

(57) ABSTRACT

A light source device includes an excitation-light light source which emits excitation light, a reflection member which reflects the excitation light, a lens which is arranged on an optical path of the excitation light which leads from the excitation-light light source to the reflection member and refracts the excitation light, a housing which houses the reflection member in a hermetically sealed internal space, an operation member which is exposed from the housing in a direction which intersects the optical path and is moved towards the inside and outside of the housing, and an adjustment mechanism which adjusts a length of an optical path between the reflection member and the lens in linkage with the operation member which is moved towards the inside and outside of the housing.

15 Claims, 12 Drawing Sheets

(56) References Cited

FOREIGN PATENT DOCUMENTS

| | | |
|---|---|---|
| JP | 2017-009684 A | 1/2017 |
| JP | 2018-120174 A | 8/2018 |
| WO | 2019/069563 A1 | 4/2019 |

LIGHT SOURCE DEVICE, PROJECTOR AND LIGHTING DEVICE

TECHNICAL FIELD

The present invention relates to a light source device, a projector, and a lighting device which use the light source device respectively.

BACKGROUND ART

In the technical field concerned, a light source device which converts excitation light which is emitted from a solid-state light source to visible light using a phosphor and efficiently emits the visible light is proposed. As one example of the above-described light source device, a configuration that "the light source device includes a wavelength conversion member which has a substrate which is made rotatable about a predetermined axis of rotation and a phosphor layer which is provided on the substrate with a phosphor being contained therein, a light source, a condensing optical system which performs irradiation so as to condense the excitation light which is emitted from the light source on the phosphor layer, and a casing in which a hermetically sealed space which houses the wavelength conversion member so as to isolate the wavelength conversion member from the outside is formed (extracted from Abstract)" is disclosed in Patent Literature 1.

CITATION LIST

Patent Literature

Patent Literature 1: JP 2012-018762 A
Patent Literature 2: JPH 08-076005 A

SUMMARY OF THE INVENTION

Technical Problem

In the light source device, which is configured as described above, there are cases where the excitation light is not appropriately condensed on the phosphor layer due to dimensional errors and installation errors of constitutional components. Then, in a case where the excitation light is not condensed on the phosphor layer, such a problem arises that an amount of light which is output from the phosphor layer is reduced. In particular, in the light source device which is configured as described above, since the wavelength conversion member and the condensing optical system are arranged at positions which are extremely close to each other in order to make visible light which is converted by the phosphor layer incident upon the condensing optical system without omission, a slight deviation in distance between the wavelength conversion member and the condensing optical system induces a great reduction in light amount. Incidentally, this problem also arises not only between the wavelength conversion member and the condensing optical system but also on other optical systems of the type that a lens which refracts the excitation light and a reflection member which reflects the excitation light which passes through the lens are included.

Accordingly, it is conceived to adjust the distance between the wavelength conversion member and the condensing optical system by equipped a lens driver which is described in, for example, Patent Literature 2 on the light source device. However, in a case where a lens driver such as the above-described one is equipped on the light source device, such a new problem arises that the light source device is enlarged and complicated.

The present invention has been made in order to solve the above-described problems and aims to provide a light source device which includes a mechanism which is simple in structure and is capable of adjusting a length of an optical path between the reflection member and the lens, and a projector and a lighting device which include the light source device respectively.

Solution to Problem

In order to solve the above-described problems, the present invention includes configurations which are described in patent claims. As one example, according to one embodiment of the present invention, there is provided a light source device which includes an excitation-light light source which emits excitation light, a reflection member which reflects the excitation light, a lens which is arranged on an optical path of the excitation light which leads from the excitation-light light source to the reflection member and refracts the excitation light, a housing which houses the reflection member in a hermetically sealed internal space, an operation member which is exposed from the housing in a direction which intersects the optical path and is moved towards the inside and outside of the housing, and an adjustment mechanism which adjusts a length of an optical path between the reflection member and the lens in linkage with the operation member which is moved towards the inside and outside of the housing.

Advantageous Effects of Invention

According to the present invention, it becomes possible to provide the light source device which includes the mechanism which is simple in structure and is capable of adjusting the length of the optical path between the reflection member and the lens, and the projector and the lighting device which include the light source device respectively. Objects, configurations and advantageous effect of the present invention other than the above will become apparent from the following description of one embodiment of the present invention.

DESCRIPTION OF EMBODIMENTS

Figure 1:
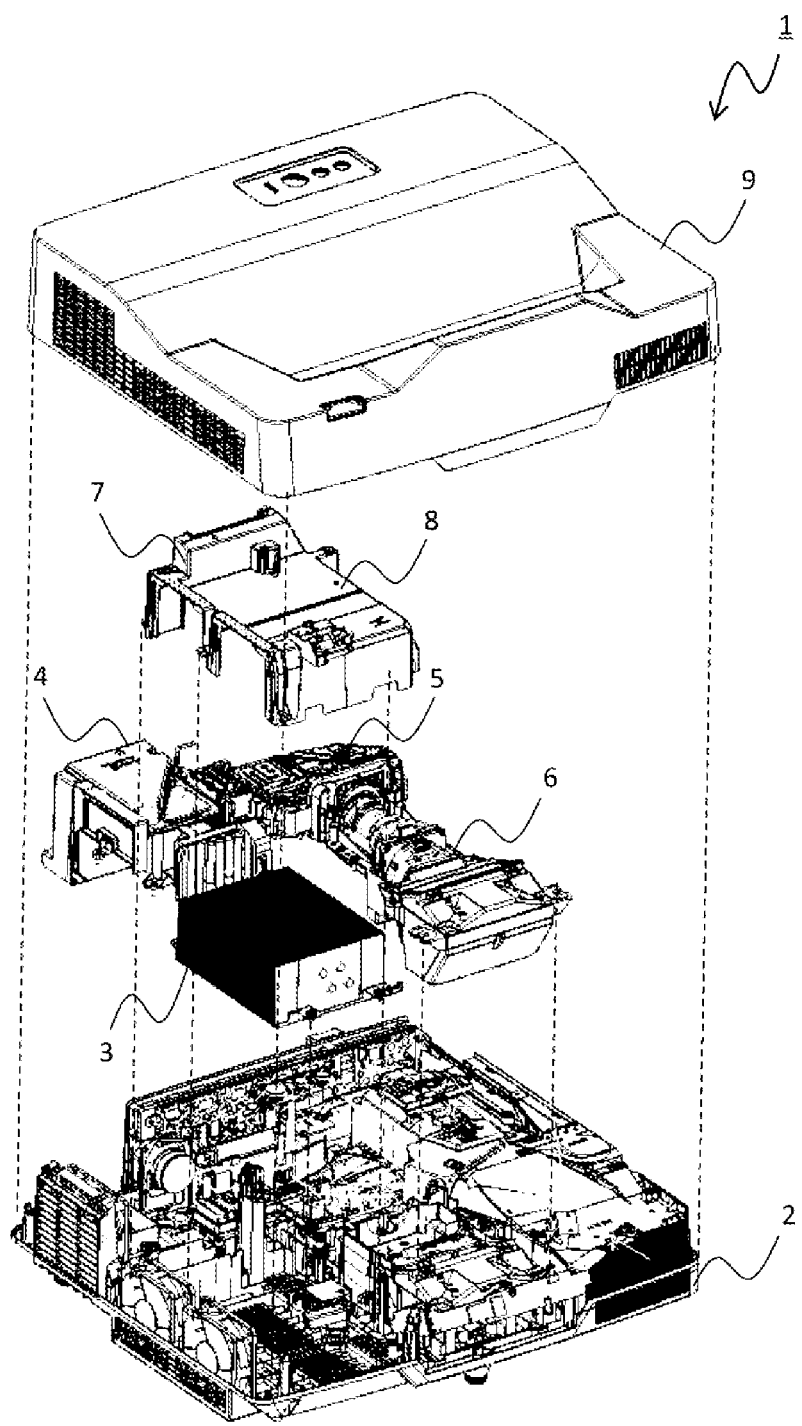
FIG. 1 is an exploded perspective view illustrating one example of a projector according to one embodiment of the present invention.
Figure 2:
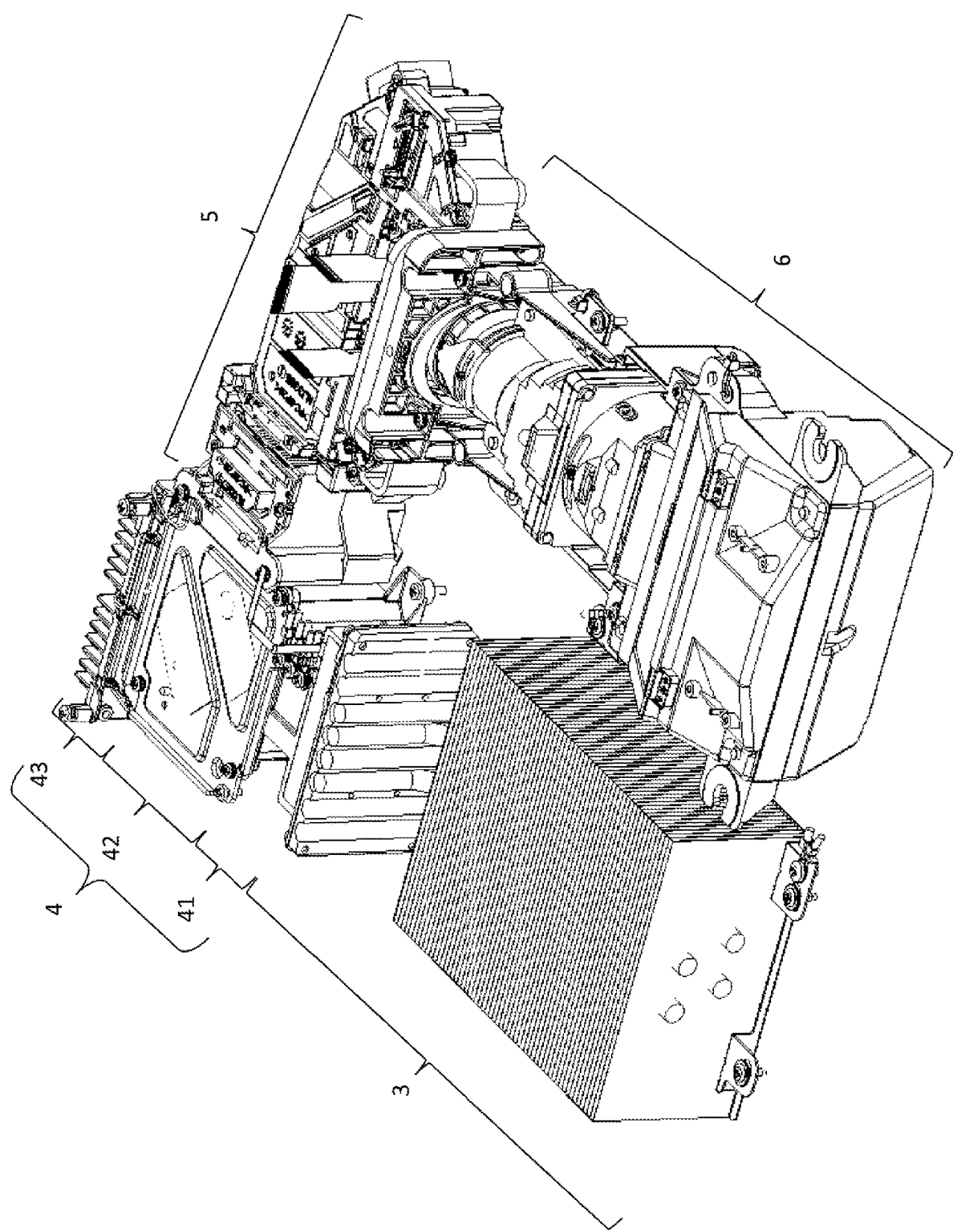
FIG. 2 is an external view illustrating one example of constitutional components of the projector.
Figure 3:
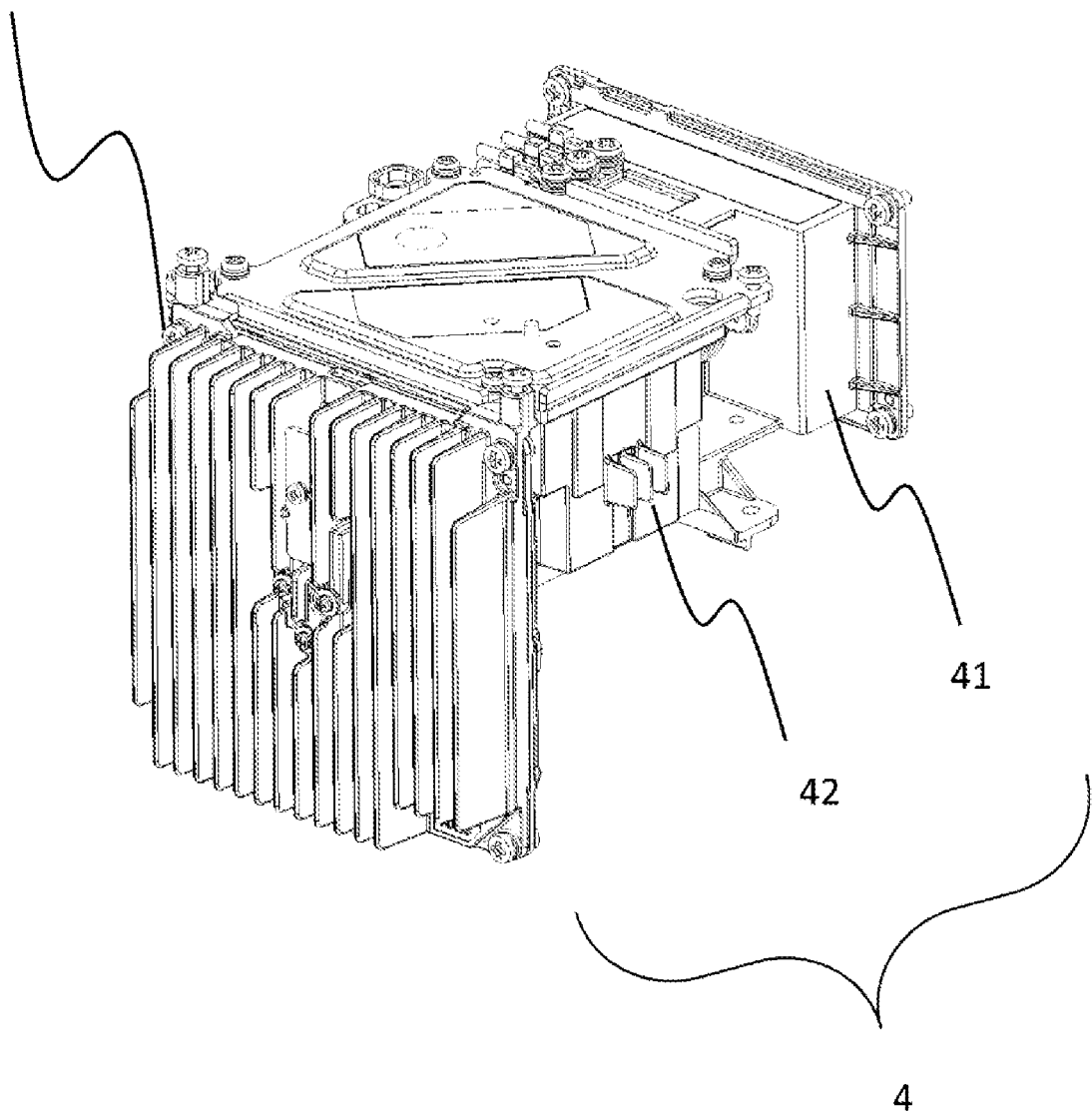
FIG. 3 is a schematic view illustrating one example of an optical engine.
Figure 4:
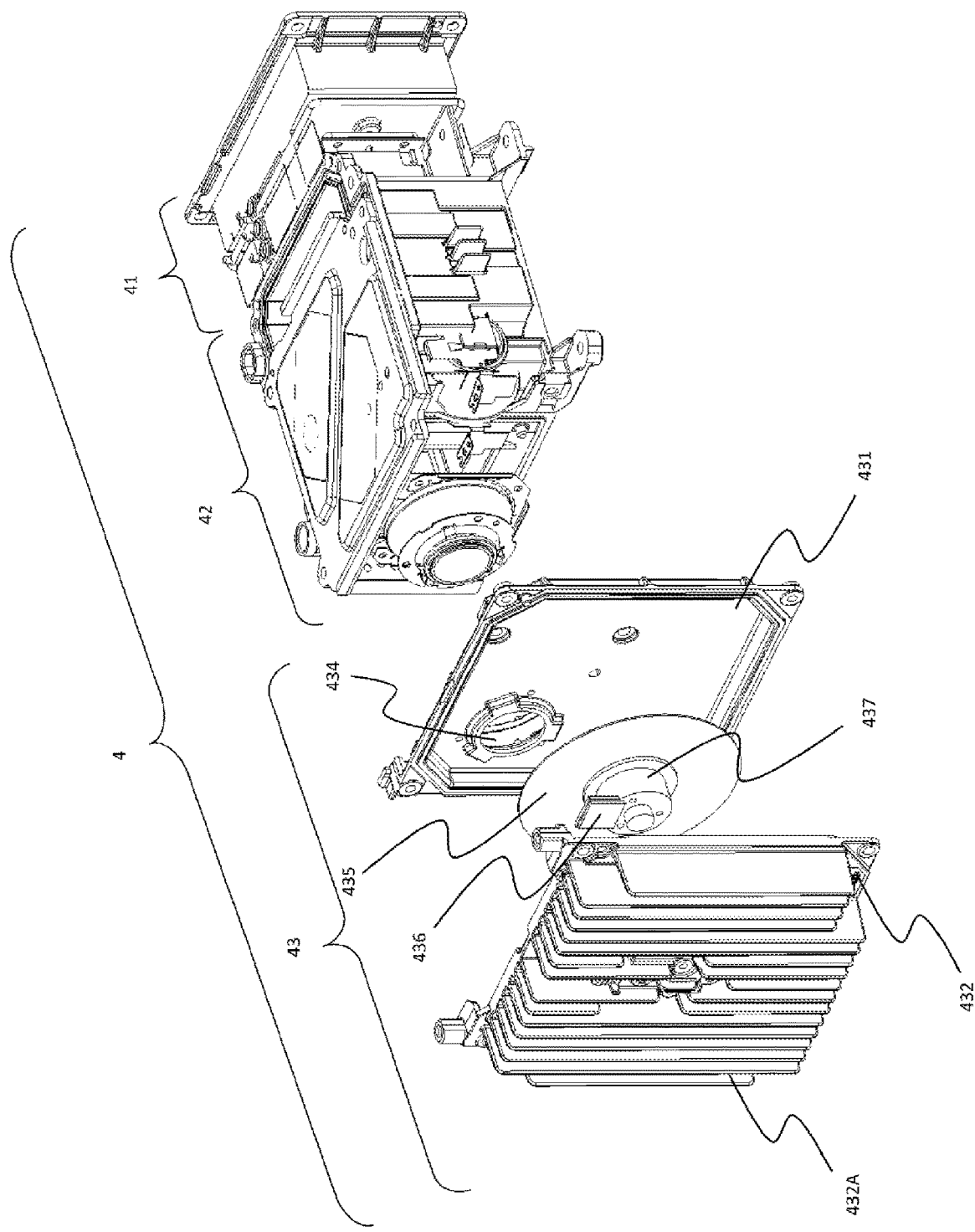
FIG. 4 is an exploded perspective view illustrating one example of the optical engine.
Figure 5:
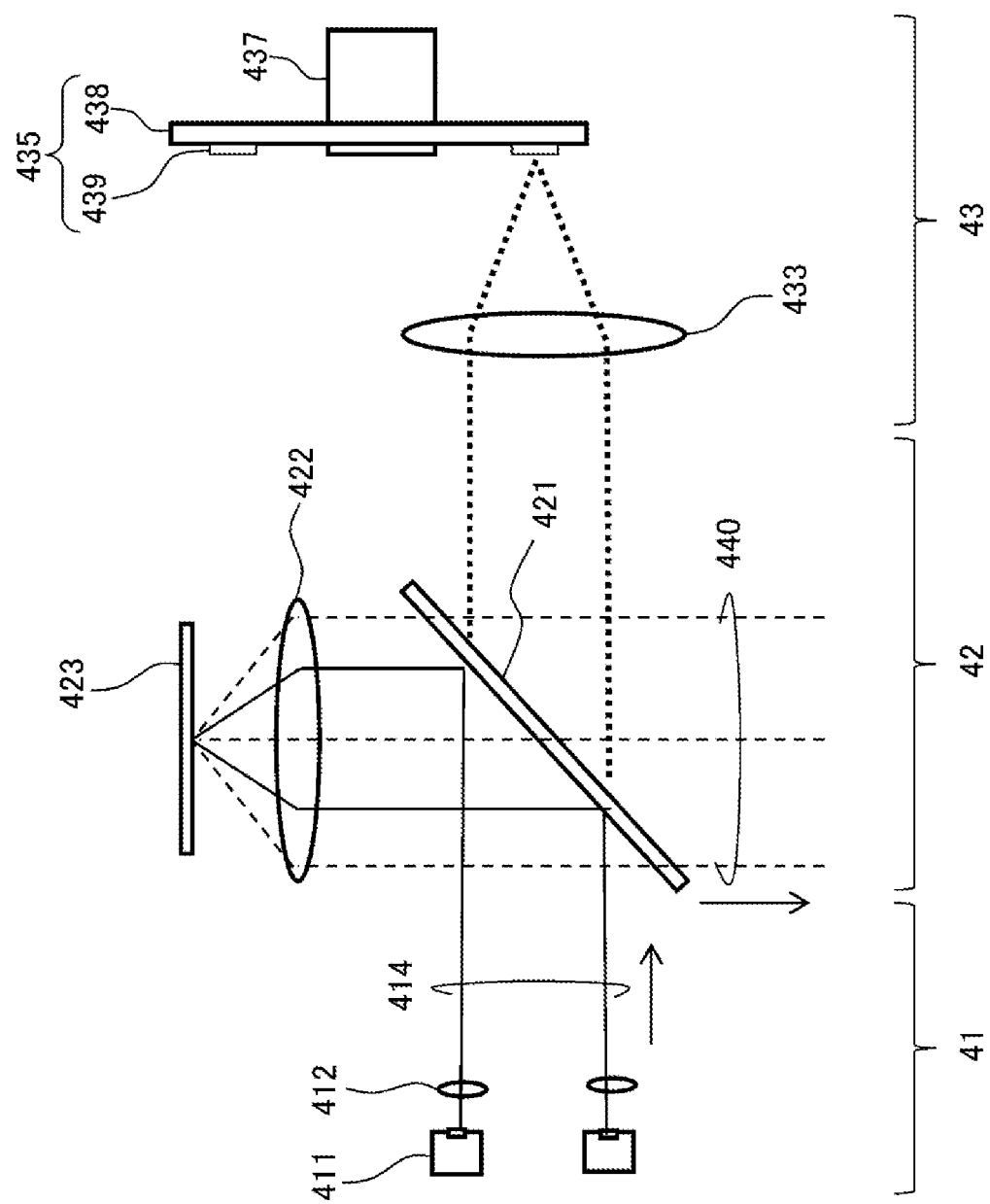
FIG. 5 is a diagram illustrating one example of an internal structure of the optical engine.

In the following, a projector (a projection type video display device) 1 according to one embodiment of the present invention will be described with reference to FIG. 1 to FIG. 5. FIG. 1 is an exploded perspective view illustrating one example of the projector 1. FIG. 2 is an external view illustrating one example of constitutional components of the projector 1. FIG. 3 is a schematic view illustrating one example of an optical engine 4. FIG. 4 is an exploded perspective view illustrating one example of the optical engine 4. FIG. 5 is a diagram illustrating one example of an internal structure of the optical engine 4.

As illustrated in FIG. 1, the projector 1 is configured by housing the respective constitutional components of the projector 1 in a box-shaped bottom case 2 and putting an upper case 9 on the bottom case 2. A heat pipe 3, the optical engine 4 which is disposed adjacent to the heat pipe 3, a panel optical system 5 which emits video light which includes video information displayed on a panel by using light emitted from the optical engine 4, and a projection optical system 6 which includes optical elements (a lens unit and a concave mirror) which project the video light in an enlarged state are housed in the bottom case 2. An upper part of the heat pipe 3 is covered with a duct cover 8 in which a cooling duct 7 is formed.

As illustrated in FIG. 2 to FIG. 4, the optical engine 4 is installed by lining up a laser module housing 41, a color synthesis unit 42, and a phosphor wheel housing 43 in an optically connected state. The optical engine 4 corresponds to a light source device.

As illustrated in FIG. 5, the laser module housing 41 mainly includes a laser light source 411 and a collimate lens 412. The laser light source 411 is configured by arranging one or more solid-state light emitting element(s) such as a laser light emitting element(s) and so forth and emits, for example, blue laser light as excitation light 414. The laser light source 411 corresponds to an excitation-light light source. The excitation light (indicated by a solid line) which is emitted from the laser light source 411 is converted to almost parallel (collimated) light through the collimate lens 412 and is incident upon the color synthesis unit 42.

As illustrated in FIG. 2, a face of the laser module housing 41 which is located on the opposite side of the color synthesis unit 42 faces the heat pipe 3. Then, heat which is generated from the laser light source 411 is discharged to the outside of the laser module housing 41 along a wall face of the laser module housing 41 and is air-cooled through the heat pipe 3.

As illustrated in FIG. 5, the color synthesis unit 42 mainly includes a dichroic mirror 421, a condensing lens 422, and a diffusion plate 423. The dichroic mirror 421 reflects and transmits the excitation light 414 and reflects fluorescent light (yellow). The condensing lens 422 is arranged on an optical path of the excitation light 414 which leads from the laser light source 411 to the diffusion plate 423. The condensing lens 422 corresponds to a lens which refracts (condenses) the excitation light 414 and the diffusion plate 423 corresponds to a reflection member.

Some of the excitation light 414 is reflected from the dichroic mirror 421, is condensed by the condensing lens 422, and is incident upon the diffusion plate 423. The excitation light 414 which is incident upon the diffusion plate 423 is diffused by and reflected from the diffusion plate 423, then passes through the condensing lens 422 and the dichroic mirror 421, and is emitted to the panel optical system 5. In addition, some other of the excitation light 414 which enters from the laser light source 411 transmits through the dichroic mirror 421 and is emitted to the phosphor wheel housing 43.

As illustrated in FIG. 4, the phosphor wheel housing 43 includes a first housing part 431 which faces the color synthesis unit 42 and a second housing part 432 which is located on an opposite side of the color synthesis unit 42. The first housing part 431 and the second housing part 432 are joined with each other via rubber packing (illustration is omitted) which is applied on peripheral edges thereof and thereby an internal space which is formed therebetween is hermetically sealed. The phosphor wheel housing 43 corresponds to a housing. In addition, the first housing part 431 and the second housing part 432 respectively correspond to a first housing and a second housing that the peripheral edges thereof are brought into close contact with each other to form the internal space therebetween.

A lens hole 434 into which a condensing lens 433 is inserted is formed in the first housing part 431. The first housing part 431 supports the condensing lens 433 (FIG. 5) which is inserted into the lens hole 434, an adjustment mechanism 500 which will be described later and an operation member 560 which will be described later. The condensing lens 433 is arranged on an optical path of the excitation light 414 which leads from the laser light source 411 to a phosphor wheel 435. The condensing lens 433 (FIG. 5) corresponds to a lens which refracts (condenses) the excitation light 414. Fins 432A are formed on an outer surface of the second housing part 432. Thereby, the internal space (which is formed between the first and second housing parts 431 and 432 of) the phosphor wheel housing 43 is cooled.

As illustrated in FIG. 4, the phosphor wheel 435, a motor substrate 436, and a wheel motor 437 are mainly housed in the hermetically sealed internal space in the phosphor wheel housing 43. The phosphor wheel 435 includes a substrate 438 (FIG. 5) and a phosphor layer 439 (FIG. 5) which is laminated on a face (a surface) on the side of the substrate 438 which faces the condensing lens 433 (FIG. 5). The phosphor wheel 435 corresponds to a reflection member and a wavelength conversion member.

The phosphor layer 439 (FIG. 5) includes a functional film which converts the excitation light 414 which is incident upon the phosphor layer 439 to fluorescence light and then reflects the fluorescence light. Although no particular limitation is put on the material of the functional film, the functional film may be configured by, for example, a sintered body phase which contains phosphor particles and aluminum oxide (alumina) and an air phase. The phosphor particles are YAG (Yttrium Aluminum Garnet) particles or LAG (Lutetium Aluminum Garnet) particles. The motor substrate 436 drives the wheel motor 437 in accordance with control of a controller (illustration is omitted) that the projector 1 includes. The wheel motor 437 rotates the phosphor wheel 435.

The excitation light 414 which is emitted from the color synthesis unit 42 is condensed by the condensing lens 433 and is converted to fluorescent light by the phosphor wheel 435. Then, the fluorescent light which is converted by the phosphor wheel 435 passes through the condensing lens 433, is reflected from the dichroic mirror 421, and is emitted to the panel optical system 5 (FIG. 1). Therefore, light which is emitted from the optical engine 4 becomes white light 440 which is obtained by mixing together a color of the excitation light 414 which is diffused by and reflected from the diffusion plate 423 and a color of the fluorescent light which is reflected from the phosphor wheel 435.

Figure 6:
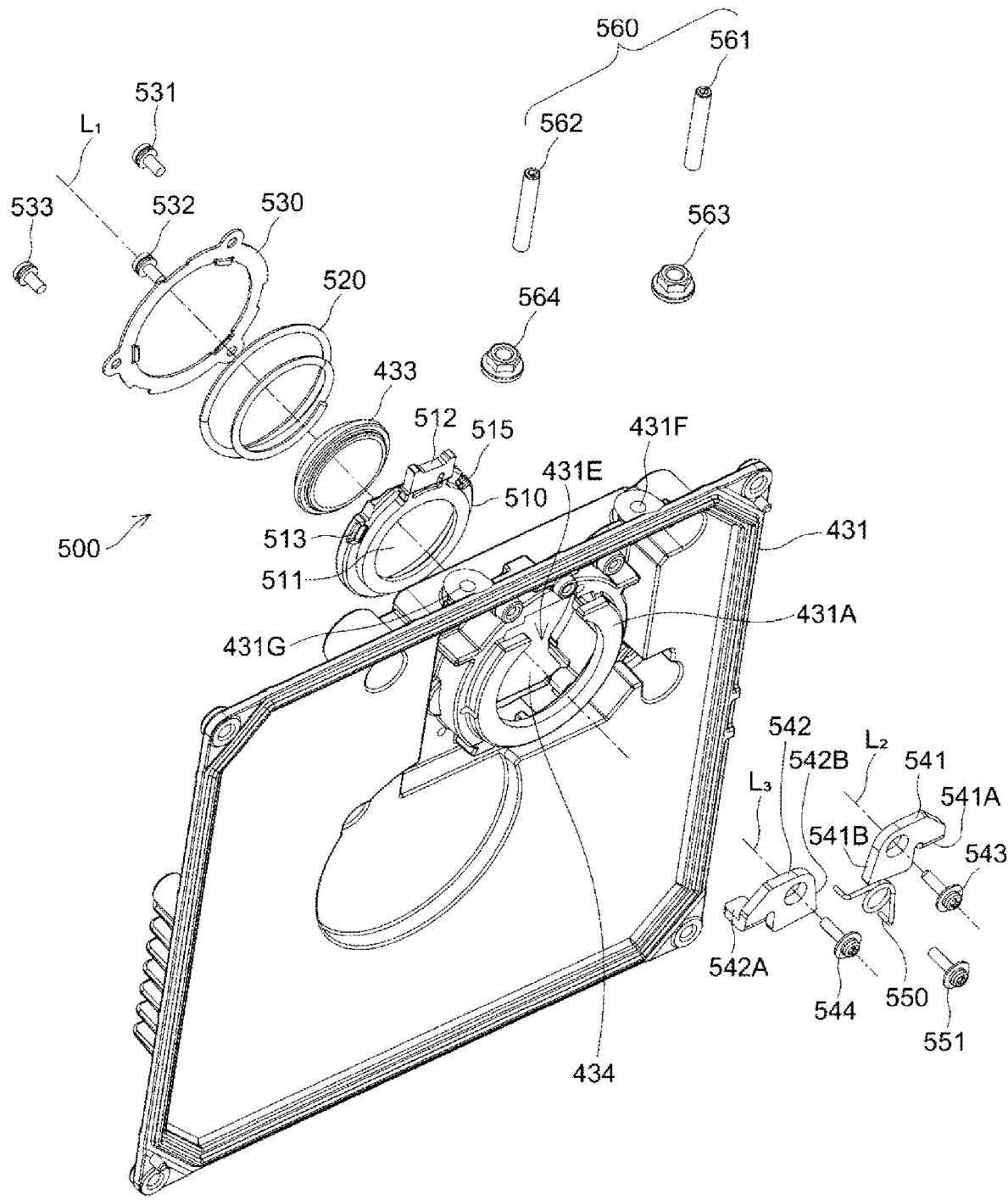
FIG. 6 is an exploded perspective view illustrating one example of a first housing part, an adjustment mechanism and an operation member.
Figure 7:
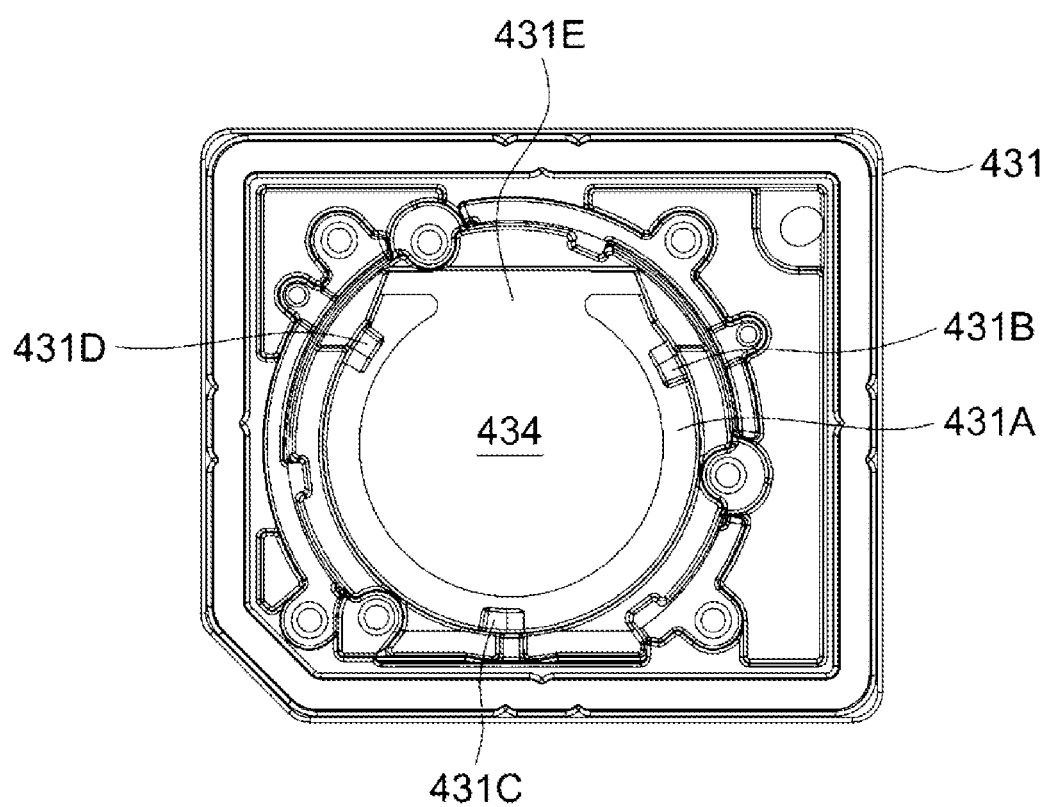
FIG. 7 is a front view illustrating one example of the side of the first housing part that protruded portions are provided.
Figure 8:
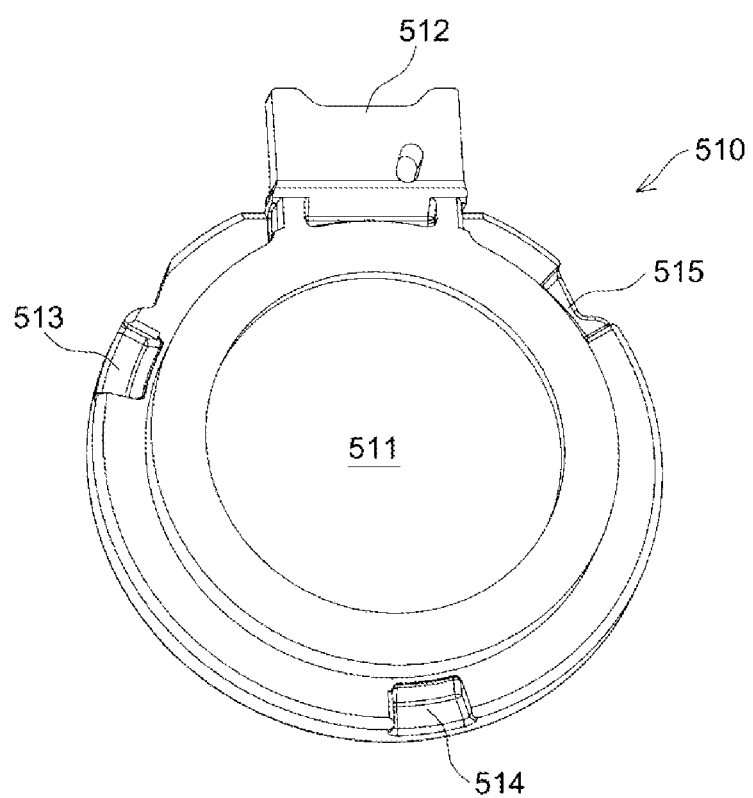
FIG. 8 is a perspective view illustrating one example of the side of a rotation ring that recessed portions are provided.
Figure 9:
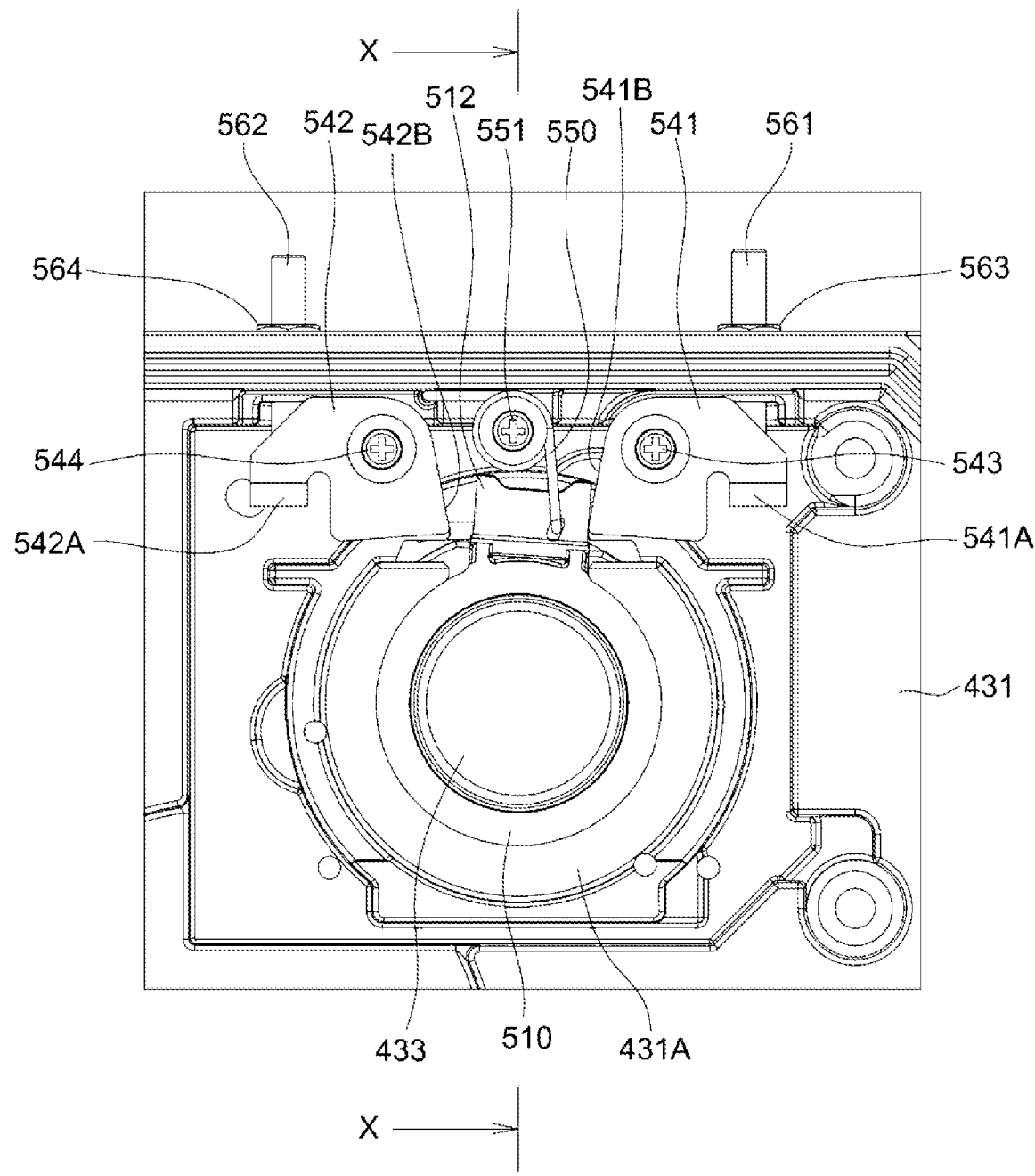
FIG. 9 is a diagram illustrating one example of a positional relation among bolts, transmission members, and the rotation ring.
Figure 10:
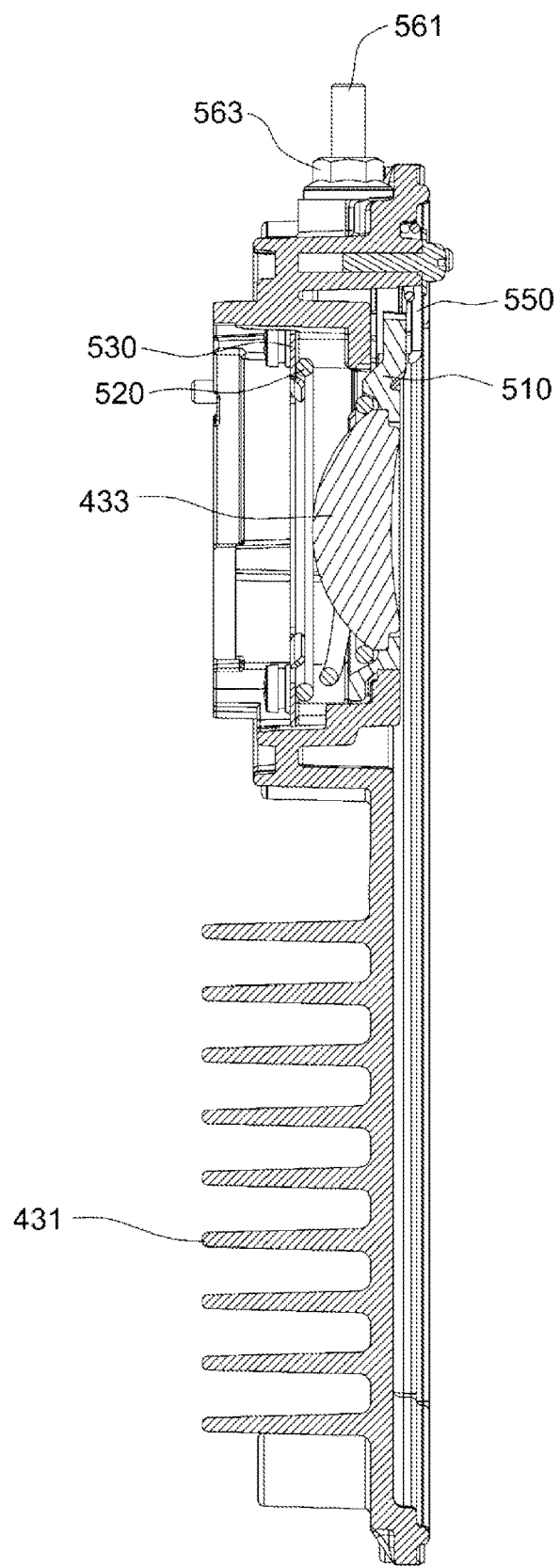
FIG. 10 is a cross sectional diagram viewing on the X-X line in FIG. 9.
Figure 11:
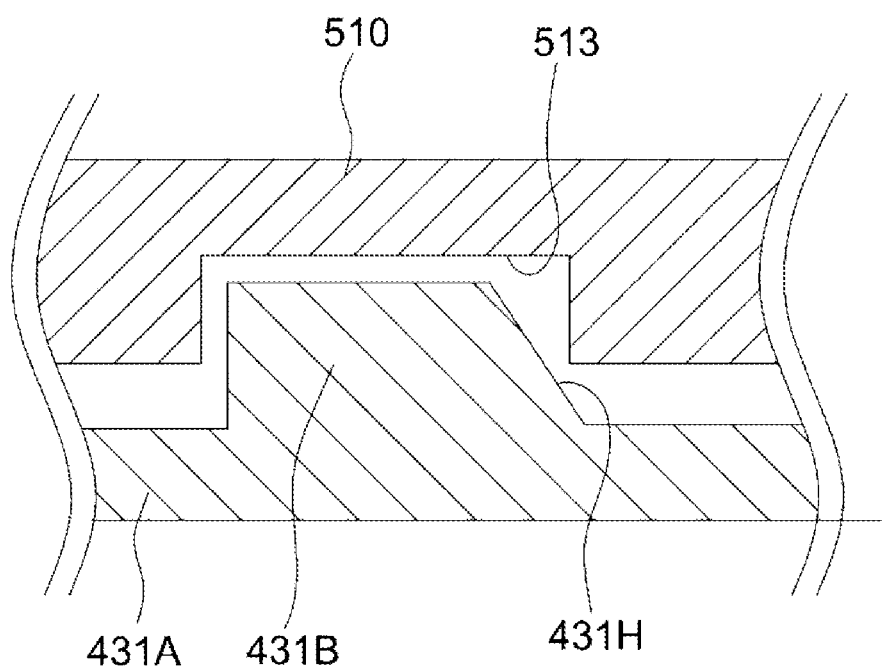
FIG. 11 is a diagram illustrating one example of a state where the recessed portion accepts the protruded portion.
Figure 12:
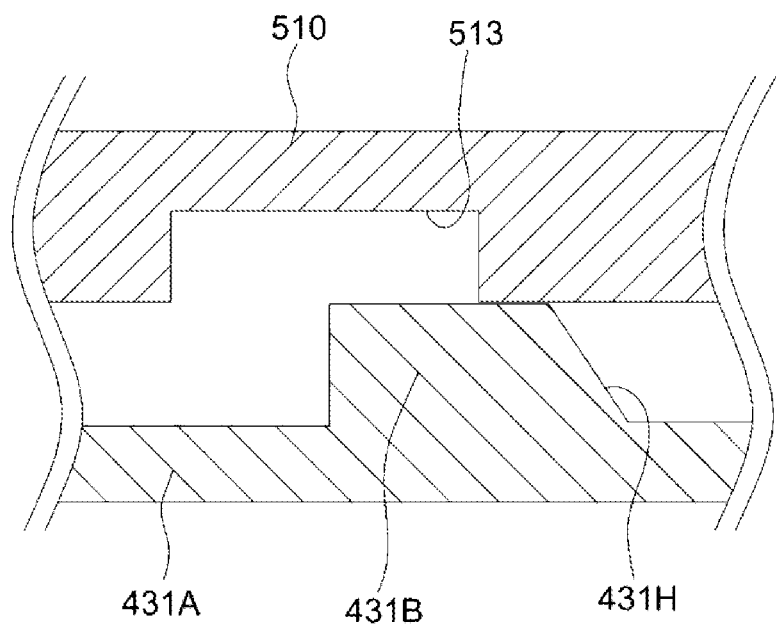
FIG. 12 is a diagram illustrating one example of a state where the protruded portion runs on a peripheral edge of the recessed portion.

Next, the adjustment mechanism 500 and the operation member 560 of the projector 1 according to the present embodiment will be described with reference to FIG. 6 to FIG. 12. FIG. 6 is an exploded perspective view illustrating one example of the first housing part 431, the adjustment mechanism 500, and the operation member 560. FIG. 7 is a front view illustrating one example of the side of the first housing part 431 on which protruded portions 431B to 431D are provided. FIG. 8 is a perspective view illustrating one example of the side of a rotation ring 510 in which recessed portions 513 to 515 are provided. FIG. 9 is a diagram illustrating one example of a positional relation among bolts 561, 562, transmission members 541, 542, and the rotation ring 510. FIG. 10 is a cross sectional diagram viewing on the X-X line in FIG. 9. FIG. 11 is a diagram illustrating one example of a state where the recessed portion 513 accepts the protruded portion 431B. FIG. 12 is a diagram illustrating one example of a state where the protruded portion 431B runs on a peripheral edge of the recessed portion 513.

As illustrated in FIG. 6, the adjustment mechanism mainly includes the rotation ring 510, a coil spring 520, a pressing member 530, the transmission members 541, 542, and a torsion coil spring 550. In addition, the operation member 560 mainly includes the bolts 561, 562. The adjustment mechanism 500 moves the condensing lens 433 along the optical path of the excitation light 414 in linkage with a motion of the operation member 560 which is manually operated by an operator. Thereby, a length of an optical path between the condensing lens 433 and the phosphor wheel 435 is adjusted.

The first housing part 431 has a ring portion 431A at a position which surrounds the lens hole 434. The ring portion 431A exhibits an open-top C-shaped outer form. In addition, as illustrated in FIG. 7, the protruded portions 431B, 431C, and 431D are formed on a wall face of the ring portion 431A which is located on the side that the ring portion 431A contacts on the rotation ring 510. The protruded portions 431B to 431D are arranged at predetermined intervals (at intervals of about 120 degrees in the present embodiment) in a circumferential direction.

In addition, a slit 431E is formed in an opened portion (that is, an upper end of the lens hole 434) of the ring portion 431A. Further, bolt holes 431F and 431G (FIG. 6) which penetrate in a direction which intersects (is orthogonal to) the optical path of the excitation light 414 (FIG. 5) are formed in the first housing part 431. One ends of the bolt holes 431F and 431G are exposed to the outside of the first housing part 431 and the other ends thereof are located in the vicinity of the slit 431E.

As illustrated in FIG. 6 and FIG. 8, the rotation ring 510 exhibits a ring-shaped outer form that a through-hole 511 is formed in the center. A thickness-direction one-side wall face of the rotation ring 510 contacts on the ring portion 431A of the first housing part 431. In addition, a thickness-direction other-side wall face of the rotation ring 510 contacts on the condensing lens 433. The rotation ring 510 corresponds to a rotation member.

The rotation ring 510 includes a projection 512. The projection 512 projects from one place of an outer edge of the rotation ring 510 radially outward. In addition, the recessed portions 513, 514, and 515 are formed in a wall face of the rotation ring 510 which is located on the side that the rotation ring 510 contacts on the ring portion 431A. Positions and sizes of the recessed portions 513 to 515 are so defined as to make it possible to accept the protruded portions 431B to 431D which are formed on the ring portion 431A. However, the recessed portions may be formed in the first housing part 431, and the protruded portions may be formed on the rotation ring 510. That is, the protruded portions may be formed on one of the mutually contact wall faces of the first housing part 431 and the rotation ring 510 and the recessed portions may be formed in the other of the mutually contact wall faces thereof.

In a case where the rotation ring 510 is fitted into the ring portion 431A of the first housing part 431, the through-hole 511 communicates with the lens hole 434, the projection 512 is exposed to an opposite-side face of the first housing part 431 through the slit 431E, and the recessed portions 513 to 515 accept the corresponding protruded portions 431B to 431D. Then, the rotation ring 510 is supported to the first housing part 431 in a state of being rotatable around an axis line $L_1$ which extends in a direction that the optical path of the excitation light 414 runs.

The coil spring 520 is arranged on the opposite side of the rotation ring 510 with the condensing lens 433 being sandwiched therebetween. The pressing member 530 is fixed to the first housing part 431 with the bolts 531, 532, and 533. The pressing member 530 presses the rotation ring 510, the condensing lens 433, and the coil spring 520 against the first housing part 431 from the side which is more outward than the coil spring 520. Thereby, the coil spring 520 energizes the rotation ring 510 and the condensing lens 433 in a direction that the rotation ring 510 and the condensing lens 433 are pressed against the first housing part 431 (in other words, a direction that the rotation ring 510 and the condensing lens 433 approach the phosphor wheel 435).

The transmission members 541 and 542 are arranged on the opposite side of the rotation ring 510 with the first housing part 431 being sandwiched therebetween. The transmission members 541 and 542 are arranged so as to sandwich the projection 512 which is exposed to the outside through the slit 431E in a circumferential direction. In addition, the transmission members 541 and 542 are supported to the first housing part 431 with the bolts 543 and 544 in a state of being rotatable around axis lines $L_2$ and $L_3$ which extend in the direction that the optical path of the excitation light 414 runs. The transmission member 541 corresponds to a first transmission member and the transmission member 542 corresponds to a second transmission member.

The transmission members 541 and 542 have first contact parts 541A and 542A and second contact parts 541B and 542B respectively. The first contact parts 541A and 542A are located at positions where contact on bolts 561 and 562 which are screwed into the bolt holes 431F and 431G is possible. The second contact parts 541B and 542B are located at positions where contact on the projection 512 of the rotation ring 510 is possible. The transmission members 541 and 542 play a role of converting linear motions of the corresponding bolts 561 and 562 to rotational motions and transmitting the rotational motions to the rotation ring 510. Motions of the transmission members 541 and 542 will be described later.

The torsion coil spring 550 is fixed to the first housing part 431 with a bolt 551 in a state where one end thereof contacts on the first housing part 431 and the other end thereof contacts on the rotation ring 510. The torsion coil spring 550 energizes the rotation ring 510 in a direction that the projection 512 is pressed against the transmission member 541. The coil spring 520 corresponds to a first energization member and the torsion coil spring 550 corresponds to a second energization member. However, concrete examples of the first energization member and the second energization member are not limited to a coil spring and a torsion coil spring and a leaf spring, elastic rubber, and so forth may be adopted.

The bolts 561 and 562 are squeezed in a state of being screwed into the bolt holes 431F and 431G and thereby linearly move in a direction that the bolts 561 and 562 towards the inside of the first housing part 431 (that is corresponding to moving downward towards the first housing part 43, in FIG. 6) and a direction that the bolts 561 and 562 towards the outside of the first housing part 431 (that is corresponding to moving upward from the first housing part 431, in FIG. 6). The bolts 561 and 562 which move in the direction that the bolts 561 and 562 are moved towards the inside of (downward) the first housing part 431 contact on the first contact parts 541A and 542A and rotate the transmission members 541 and 542 around the axis lines $L_2$ and $L_3$. Nuts 563 and 564 are screwed on the bolts 561 and 562 on the opposite sides of the transmission members 541 and 542 with the bolt holes 431F and 431G being sandwiched therebetween. The bolt 561 corresponds to a first bolt, the bolt 562 corresponds to a second bolt and the nuts 563 and 564 correspond to fixing members.

Next, a procedure that the operator operates the operation member 560 and adjusts a length of an optical path between the condensing lens 433 and the phosphor wheel 435 will be described. The following work is conducted in a process of correcting a variation in manufacture of each projector 1 in respective processes for manufacturing the projector 1. Incidentally, it is supposed that the projector 1 is in the following state before execution of this work.

First, as illustrated in FIG. 9, the second contact part 541B of the transmission member 541 contacts on the projection 512 and the second contact part 542B of the transmission member 542 is separated from the projection 512. In addition, as illustrated in FIG. 11, the recessed portions 513, 514, and 515 (illustration of the recessed portions 514 and 515 is omitted) are in a state of accepting the corresponding protruded portions 431B, 431C, and 431D (illustration of the protruded portions 431C and 431D is omitted). Further, the following work is conducted, for example, in a state where a power source of the projector 1 is turned on and an image is displayed on a screen.

First, the operator squeezes the bolt 561 in a direction that the bolt 561 moves towards the inside of the first housing part 431. Thereby, the bolt 561 contacts on the first contact part 541A of the transmission member 541 so as to rotate the transmission member 541 clockwise in FIG. 9. The transmission member 541 which rotates clockwise pushes the projection 512 via the second contact part 541B so as to rotate the rotation ring 510 counterclockwise in FIG. 9 against energization force of the torsion coil spring 550.

In a case where the rotation ring 510 rotates around the axis line $L_1$, the protruded portion 431B runs on the peripheral edge of the recessed portion 513 along a slope 431H which is formed on the protruded portion 431B as illustrated in FIG. 12. Incidentally, although illustration is omitted, the phenomenon which is the same as the above occurs also between the protruded portion 431C and the recessed portion 514 and between the protruded portion 431D and the recessed portion 515. Thereby, the rotation ring 510 moves the condensing lens 433 in a direction that the condensing lens 433 is separated from the phosphor wheel 435 against the energization force of the coil spring 520. That is, the length of the optical path between the condensing lens 433 and the phosphor wheel 435 is changed.

In a case where the length of the optical path between the condensing lens 433 and the phosphor wheel 435 is changed, a condensing degree of the excitation light 414 on the phosphor wheel 435 is changed. As a result, a brightness of the image that the projector 1 displays on the screen is changed. Therefore, the operator adjusts the bolt 561 to a position where the image of a desirable brightness (typically, the brightest image) is displayed. Then, the operator screws the nut 563 and brings the bolt 561 into contact on the first housing part 431 in order to fix the bolt 561 at the position where the image of the desirable brightness is obtained.

Further, the operator squeezes the bolt 562 in a direction that the bolt 562 moves towards the inside of the first housing part 431. Thereby, the bolt 562 contacts on the first contact part 542A of the transmission member 542. As a result, the transmission member 542 rotates counterclockwise in FIG. 9. Then, the operator screws the nut 564 on the bolt 562 and brings the bolt 562 into contact on the first housing part 431 in order to fix the bolt 562 at a position where the second contact part 542B of the transmission member 542 contacts on the projection 512.

According to the above-described embodiment, for example, operational effects such as the following are exhibited.

As illustrated in FIG. 4 and FIG. 5, many constitutional components (for example, the laser light source 411, the collimate lens 412, the dichroic mirror 421, the phosphor wheel 435, the fins 432A and so forth) are arranged in the optical engine 4 along the optical path of the excitation light 414. Therefore, in a case of trying to expose the bolts 561 and 562 in a direction which follows the optical path of the excitation light 414, it is necessary to arrange the bolts 561 and 562 away from these constitutional components and distances from the adjustment mechanism 500 to positions where the bolts 561 and 562 are exposed are increased.

Accordingly, it becomes possible to reduce the distances from the adjustment mechanism 500 to the positions where the bolts 561 and 562 are exposed by exposing the bolts 561 and 562 in a direction which is orthogonal to the optical path of the excitation light 414 as in the above-described embodiment. In addition, since the adjustment mechanism 500 adjusts the length of the optical path between the condensing lens 433 and the phosphor wheel 435 in linkage with the bolts 561 and 562 which are moved towards the inside and outside (corresponding to downward and upward in FIG. 6) of the first housing part 431 by the manual operation of the operator, it becomes possible to realize the adjustment mechanism 500 which is simple in structure in comparison with the lens driver which includes the motor and is described in the Patent Literature 2.

In addition, as in the above-described embodiment, the bolts 561 and 562 which are screwed into the corresponding bolt holes 431F and 431G are used as the operation member 560 and thereby, even though the operation member 560 is exposed to the outside of the first housing part 431, it becomes possible to ensure dust resistance which is necessary for the optical engine 4 with no need of attachment of packing and so forth. In addition, since the position of the condensing lens 433 is adjusted by the operation of squeezing the bolts 561 and 562, fine adjustment of optical path length is facilitated.

In addition, according to the above-described embodiment, the condensing lens 433 is moved in a direction that the condensing lens 433 is separated from the phosphor wheel 435 against the energization force of the coil spring 520 by making the protruded portions 431B, 431C, and 431D run on the peripheral edges of the corresponding recessed portions 513, 514, and 515. Since the condensing lens 433 is typically pressed from the both sides of the optical path of the excitation light 414 in this way, it becomes possible to suppress rattling of the condensing lens 433 in the direction that the optical path of the excitation light 414 runs.

In addition, as in the above-described embodiment, the rotation ring 510 is pressed against the transmission member 541 by the torsion coil spring 550 and thereby it becomes possible to suppress positional deviation of the condensing lens 433 which would occur along the optical path of the excitation light 414 caused by the rattling of the rotation ring 510 in the circumferential direction.

In addition, as in the above-described embodiment, the condensing lens 433 is moved to a desired position by operating the bolt 561 and then the transmission member is brought into contact on the rotation ring 510 by operating the bolt 562. Thereby, it becomes possible to more effectively suppress the rattling of the rotation ring 510 in the circumferential direction.

In addition, according to the above-described embodiment, the length of the optical path between the condensing lens 433 and the phosphor wheel 435 is adjusted and then the bolts 561 and 562 are fixed with the corresponding nuts 563 and 564. Thereby, it becomes possible to suppress a change in optical path length which would occur caused by not intended operation of the bolts 561 and 562. However, concrete examples of the fixing member are not limited to the nuts 563 and 564 and an adhesive which is charged into the bolt holes 431F and 431G may be used as the fixing member.

Further, as in the above-described embodiment, the condensing lens 433 which is an object to be moved, and the adjustment mechanism 500 and the operation member 560 which are adapted to move the condensing lens 433 are supported to the same (single) first housing part 431 and thereby it becomes possible to minimize the influence of installation errors. However, the condensing lens 433, the adjustment mechanism 500 and the operation member 560 may be partially supported to mutually different housings.

Other Modified Examples

In addition, in the above-described embodiment, an example that the position which is the closest to the phosphor wheel 435 is set as an initial position of the condensing lens 433 and the condensing lens 433 is moved in the direction that the condensing lens 433 is separated from the phosphor wheel 435 by the adjustment mechanism 500 is described. However, the moving direction of the condensing lens 433 is not limited to the above-described direction. As another example, a position which is the farthest from the phosphor wheel 435 may be set as the initial position of the condensing lens 433 and the condensing lens 433 may be moved in a direction that the condensing lens 433 approaches the phosphor wheel 435 by the adjustment mechanism 500. As yet another example, the condensing lens 433 may also be configured to be movable in both directions, that is, the direction that the condensing lens 433 is separated from the phosphor wheel 435 and the direction that the condensing lens 433 approaches the phosphor wheel 435 by the adjustment mechanism 500 with the middle of a moving range of the condensing lens 433 being set as the initial position.

In addition, in the above-described embodiment, an example that the condensing lens 433 is moved along the optical path of the excitation light 414 is described. However, the object that the adjustment mechanism 500 moves is not limited to the condensing lens 433. As another example, the adjustment mechanism 500 may move the phosphor wheel 435 along the optical path of the excitation light 414. That is, the adjustment mechanism 500 may be capable of adjusting the length of the optical path between the condensing lens 433 and the phosphor wheel 435 by changing a relative distance between the condensing lens 433 and the phosphor wheel 435.

In addition, in the above-described embodiment, an example that, in the plurality of lenses (the collimate lens 412 and the condensing lens 433) which are arranged on the optical path of the excitation light 414 which leads from the laser light source 411 to the phosphor wheel 435, the condensing lens 433 which is the closest to the phosphor wheel 435 is moved is described. However, the adjustment mechanism 500 may move the collimate lens 412 or a not illustrated another lens, in place of the condensing lens 433. That is, the lens that the present invention sets as the object to be moved is not limited to the lens which condenses the excitation light 414 and may be a lens which collimates (another example of "refracts") the excitation light 414.

In addition, in the above-described embodiment, an example that the length of the optical path between the condensing lens 433 and the phosphor wheel 435 is adjusted is described. However, an object to be adjusted is not limited to the length of the optical path between the condensing lens 433 and the phosphor wheel 435. As another example, an adjustment mechanism and an operation member which are used for changing the relative distance between the condensing lens 422 and the diffusion plate 423 may be provided for adjustment of a length of an optical path between the condensing lens 422 and the diffusion plate 423.

Further, in the above-described embodiment, the projector 1 is exemplified as the application example of the light source device according to the present invention. However, the light source device according to the present invention may also be applied to lighting devices such as stage lighting, a headlight and so forth.

REFERENCE SIGNS LIST

1 . . . projector
2 . . . bottom case
3 . . . heat pipe
4 . . . optical engine
5 . . . panel optical system
6 . . . projection optical system
7 . . . cooling duct
8 . . . duct cover
9 . . . upper case
41 . . . laser module housing
42 . . . color synthesis unit
43 . . . phosphor wheel housing
411 . . . laser light source
412 . . . collimate lens 414 . . . excitation light
421 . . . dichroic mirror
422 . . . condensing lens
423 . . . diffusion plate
431 . . . first housing part
431A . . . ring portion
431B, 431C, 431D . . . protruded portion
431E . . . slit
431F, 431G . . . bolt hole
432 . . . second housing part
432A . . . fin
433 . . . condensing lens
434 . . . lens hole
435 . . . phosphor wheel
436 . . . motor substrate
437 . . . wheel motor
438 . . . substrate
439 . . . phosphor layer
440 . . . white light
500 . . . adjustment mechanism
510 . . . rotation ring
511 . . . through-hole
512 . . . projection
513, 514, 515 . . . recessed portion
520 . . . coil spring
530 . . . pressing member
541, 542 . . . transmission member
541A, 542A . . . first contact part
541B, 542B . . . second contact part
550 . . . torsion coil spring
560 . . . operation member
561, 562 . . . bolt
563, 564 . . . nut

The invention claimed is:

1. A light source device comprising:
an excitation-light light source which emits excitation light;
a reflection member which reflects the excitation light;
a lens which is arranged on an optical path of the excitation light which leads from the excitation-light light source to the reflection member and refracts the excitation light;
a housing which houses the reflection member in a hermetically sealed internal space;
an operation member which is exposed from the housing in a direction which intersects the optical path and is moved towards the inside and outside of the housing; and
an adjustment mechanism which adjusts a length of an optical path between the reflection member and the lens in linkage with the operation member which is moved towards the inside and outside of the housing.

2. The light source device according to claim 1, wherein the adjustment mechanism moves the lens along the optical path.

3. The light source device according to claim 2, wherein the housing is configured by a first housing and a second housing between which the internal space is formed by bringing peripheral edges thereof into close contact with each other, and
the lens, the operation member, and the adjustment mechanism are supported to the first housing.

4. The light source device according to claim 3, wherein
a bolt hole which passes through in a direction which intersects the optical path is formed in the first housing, the operation member is a bolt which is screwed into the bolt hole, and
the adjustment mechanism moves the lens along the optical path in linkage with the bolt which is moved towards the inside and outside of the first housing.

5. The light source device according to claim 4, wherein
the adjustment mechanism includes
a rotation member which is supported to the first housing in a state of being rotatable around an axis line which extends in a direction of the optical path in linkage with the bolt which is moved towards the inside and outside of the first housing, and
a first energization member which is arranged on the opposite side of the rotation member with the lens being sandwiched therebetween and energizes the lens and the rotation member in the direction of the optical path,
wherein
one of a protruded portion and a recessed portion which accepts the protruded portion is formed on a wall face of the rotation member which is in contact with the first housing, and
the other of the protruded portion and the recessed portion is formed on a wall face of the first housing which is in contact with the rotation member, and
wherein
the rotation member rotates and the protruded portion runs on a peripheral edge of the recessed portion, and thereby the adjustment mechanism moves the lens in a direction which is opposite to the direction that the lens is energized by the first energization member.

6. The light source device according to claim 5, wherein
the adjustment mechanism further includes a transmission member which is supported to the first housing to be rotatable around the axis line extending in the direction of the optical path, is composed of contact with both of the bolt and the rotation member so as to convert a linear motion of the bolt to a rotational motion, and transmits the rotational motion to the rotation member.

7. The light source device according to claim 6, wherein
the adjustment mechanism further includes a second energization member which energizes the rotation member in a direction that the rotation member is pressed against the transmission member.

8. The light source device according to claim 6, wherein
the bolt includes a first bolt and a second bolt, and
the transmission member includes
a first transmission member which converts the linear motion of the first bolt to the rotational motion and thereby rotates the rotation member clockwise or counterclockwise, and
a second transmission member which converts the linear motion of the second bolt to the rotational motion and thereby rotates the rotation member in a direction which is opposite to a rotation direction that the rotation member is rotated by the first transmission member.

9. The light source device according to claim 7, wherein
the bolt includes a first bolt and a second bolt, and
the transmission member includes a first transmission member which converts the linear motion of the first bolt to the rotational motion and thereby rotates the rotation member clockwise or counterclockwise, and a second transmission member which converts the linear motion of the second bolt to the rotational motion and thereby rotates the rotation member in a direction which is opposite to a rotation direction that the rotation member is rotated by the first transmission member.

10. The light source device according to claim 1, further comprising a fixing member which fixes the operation member after adjustment of optical path length by the adjustment mechanism.

11. The light source device according to claim 1, wherein the reflection member is a wavelength conversion member which includes a phosphor layer which converts the excitation light to fluorescent light and reflects the fluorescent light.

12. The light source device according to claim 1, wherein the reflection member is a diffusion plate which diffuses and reflects the excitation light.

13. The light source device according to claim 1, wherein the lens is the closest to the reflection member among a plurality of lenses which are arranged on the optical path which leads from the excitation-light light source to the reflection member.

14. A projector, comprising the light source device according to claim 1.

15. A lighting device, comprising the light source device according to claim 1.

* * * * *